(12) United States Patent
Fasel et al.

(10) Patent No.: US 11,990,281 B2
(45) Date of Patent: May 21, 2024

(54) ELECTRODE UNIT FOR A VACUUM CAPACITOR AND A VACUUM CAPACITOR

(71) Applicant: COMET AG, Flamatt (CH)

(72) Inventors: Marco Fasel, Ueberstorf (CH); Mark Mildner, Gurbrü (CH); Timothy Weber, Bern (CH); Janina Bischof, Bern (CH)

(73) Assignee: COMET AG, Flamatt (CH)

( * ) Notice: Subject to any disclaimer, the term of this patent is extended or adjusted under 35 U.S.C. 154(b) by 297 days.

(21) Appl. No.: 17/350,659

(22) Filed: Jun. 17, 2021

(65) Prior Publication Data
US 2021/0398746 A1    Dec. 23, 2021

(30) Foreign Application Priority Data

Jun. 19, 2020  (EP) .................................... 20181200

(51) Int. Cl.
*H01G 4/32* (2006.01)
*H01G 4/005* (2006.01)
(Continued)

(52) U.S. Cl.
CPC ............... *H01G 4/02* (2013.01); *H01G 4/005* (2013.01); *H01G 4/32* (2013.01); *H01G 5/011* (2013.01); *H01G 5/013* (2013.01); *H01G 5/14* (2013.01)

(58) Field of Classification Search
CPC .......... H01G 5/013; H01G 5/011; H01G 5/14; H01G 4/32; H01G 4/005; H01G 4/02
See application file for complete search history.

(56) References Cited

U.S. PATENT DOCUMENTS 3,600,787 A * 8/1971 Lindsay ................. H01G 13/00
                                                                        29/423
3,611,075 A  10/1971 Lindsay
(Continued)

FOREIGN PATENT DOCUMENTS

CH          598687 A5      5/1978
JP       07022091 B2 *    3/1995
(Continued)

OTHER PUBLICATIONS

Yuichi Nishikiori, Vacuum Capacitor with Higher Current and Larger Capacitance (VP150 Type 5kVp-6000pF), pp. 12-13, Jun. 25, 2014, Meiden Review.†

*Primary Examiner* — David M Sinclair
(74) *Attorney, Agent, or Firm* — WRB-IP PLLC (57) ABSTRACT

The present invention relates to an electrode unit (10, 20) for an electric vacuum capacitor comprising a band-shaped capacitor plate (11, 21) with a height H, wherein the band-shaped capacitor plate (11, 21) is wound in a spiral with a maximum diameter $D_{max}$ and a constant distance between successive turns, wherein the band-shaped capacitor plate (11, 21) comprises a first longitudinal edge (11a, 21a) attached to a supporting part (12) and a second longitudinal edge (11b, 21b), the second longitudinal edge (11b, 21b) being free, wherein at the outer extremity of the spiral, the first longitudinal edge (11a, 21a) and the second longitudinal edge (11b, 21b) are connected by an inclined edge (11c, 21c) such that the first longitudinal edge (11a, 21a) is longer than the second longitudinal edge (11b, 21b), wherein the inclined edge (11c, 21c) forms with the longitudinal axis (B) of the band-shaped capacitor plate (11, 21) an angle α less than or equal to an angle $\alpha_{max}=(45°·\pi/180°)$. The invention relates also to a vacuum capacitor (30) comprising at least (Continued)

one electrode unit (10, 20) according to the present invention.

13 Claims, 8 Drawing Sheets

(51) Int. Cl.
    *H01G 4/02*          (2006.01)
    *H01G 5/011*        (2006.01)
    *H01G 5/013*        (2006.01)
    *H01G 5/14*         (2006.01)

(56) References Cited

U.S. PATENT DOCUMENTS

| | | | | |
|---|---|---|---|---|
| 4,177,495 A | * | 12/1979 | Perret | H01G 5/14 |
| | | | | 361/278 |
| 2018/0178016 A1 | * | 6/2018 | Frustaci | A61N 1/08 |
| 2019/0244759 A1 | * | 8/2019 | Hatanaka | B23K 1/0016 |

FOREIGN PATENT DOCUMENTS

| | | | | |
|---|---|---|---|---|
| JP | 08264377 A | * | 10/1996 | |
| JP | 11273998 | | 8/1999 | |
| JP | 11-273998 A | † | 10/1999 | |
| JP | 2005174989 A | * | 6/2005 | |
| WO | 2012000532 A1 | | 1/2012 | |

\* cited by examiner
† cited by third party

ELECTRODE UNIT FOR A VACUUM CAPACITOR AND A VACUUM CAPACITOR

BACKGROUND AND SUMMARY

The present invention relates to the field of vacuum capacitors. More precisely, the present invention relates, in a first aspect, to an electrode unit for a vacuum capacitor. This electrode unit comprises a supporting part made of a thermally highly conductive material, such as copper, and a spiral wound band-shaped capacitor plate made of a high-melting point metal, such as stainless steel, carbon steel, molybdenum, tantalum, tungsten, nickel, Inconel®, titanium, chromium or an alloy thereof. The inventive electrode unit permits to reach higher voltage inside the vacuum capacitor. In a second aspect, the present invention relates to a vacuum capacitor comprising at least one electrode unit according to the present invention.

Vacuum capacitors are well known in the prior art and are used in applications where both high frequencies and high power are required. Common applications include, for example, oscillation circuits for use in high power radio frequency transmission, and high frequency power supplies for use in manufacturing semiconductors, solar panels and flat panel displays.

As mentioned, vacuum capacitors are commonly used in applications in the semiconductor industry, such as for instance plasma coating and etching processes, those using electric power at 27.12 MHz, 13.56 MHz, 6.78 MHz or another radio-frequency power source. Very commonly, vacuum capacitors are used as tuning elements and are integrated inside impedance matching boxes or other equipment that guarantee optimal power transfer from a radiofrequency generator (with output impedance 50Ω) to a plasma processing chamber with dynamic load (i.e. varying impedance). There is a desire to be able to use these impedance matching boxes with higher and higher power, resulting in higher working voltages. Since higher power must be attained without increasing the size of the capacitor or of the equipment in which the capacitor is placed, the power density must increase. This tendency is further aggravated by the fact that power delivery with frequencies lower than 6.78 MHz and even lower than 4 MHz are becoming more frequent, which leads to higher voltages in vacuum capacitors even when using them for the same nominal-power power applications due to their higher impedance at these frequencies.

State of the art vacuum capacitors comprise two or more copper electrodes or electrode units, separated by a dielectric medium. Copper is generally seen as a good material for electrodes or electrode units because it has low electric losses. Even with very high RF currents, vacuum capacitors generate only modest heat which can easily be transported away from the electrodes to the collars of the enclosure by heat conduction, and subsequently from the enclosure to the surrounding atmosphere by simple convection and radiation. However, vacuum capacitors can be limited either by the current they can sustain before reaching a critical temperature or they can be limited by the voltage of the signal they can handle (depending on the application power signal frequency or duty cycle either voltage or current will be the most critical limiting factor). State of the art vacuum capacitor can sustain approximately 20-25 kV when copper electrodes are separated by 1 mm in vacuum. With increased separation of the electrodes, the voltages can be increased further but the copper vacuum capacitor will increase in size.

Copper is, as already mentioned above, a preferred electrode material since it allows for very high current ratings of the vacuum capacitors. Most vacuum capacitors are rated for a nominal current at 13.56 MHz. That current rating value can be for example, 94 ARMS at 13.56 MHz. Depending on the geometry of the capacitor sub-parts (electrodes, collars, bellow, etc. . . . ) and the heat transfer arrangements, that value can be significantly bigger or significantly smaller though. The current rating is given for a specific frequency or over a frequency range as Imax(frequency) curve. The 13.56 MHz frequency is standard for industrial processes. However, other frequencies are sometimes used in various applications such as 6.78 MHz, 2 MHz, 400 kHz or even other frequencies. The current rating is different at these other frequencies, owing to the frequency dependence of the skin effect phenomena resulting in frequency-dependent electric resistivity of the copper parts.

Besides copper, other metals for vacuum capacitor electrodes are also known to give satisfactory properties. For example, the international patent application WO 2012/000532 A1 proposes aluminium electrodes for vacuum capacitors with improved voltage withstanding capabilities. Another example is found in the Japanese patent application JP 1999 273998 A which discloses hard materials with high melting points, including stainless steel, as alternative electrode materials.

Materials for vacuum capacitor electrodes other than copper may improve the high voltage capabilities of the vacuum capacitor. Increasing the voltage capability of the capacitor without having to increase its size and without having to decrease the capacitance value is an important feature so that it may be advantageous to replace copper with other materials. This is especially advantageous for applications such as pulsed power with low duty cycles or continuous wave power at frequencies substantially less than 13.56 MHz which are not "critical in current", but rather "critical in voltage". The reasons include better overall ratio of heat generated/heat evacuated when operated in pulsed power with low duty cycle, and more favourable skin effect factor at lower frequencies.

In order to make vacuum capacitors compact, i.e. maximizing the capacitance generating surfaces in a given volume, the electrodes inside the vacuum enclosure are typically of the following two kinds: concentric cylinders as disclosed for example in the US American patent document U.S. Pat. No. 3,611,075 A or interleaved spiral electrodes as presented in the Swiss patent document CH 598 687 A5. Spiral electrodes have the added advantage that a pair of mating electrodes are self-centring, meaning the distance between the interleaved electrode surfaces are exactly at equal distance throughout.

In the case of vacuum capacitors, the dielectric medium is a vacuum. Vacuum capacitors typically require high vacuum (below 10-6 Torr) or ultra-high vacuum (below 10-9 Torr). The vacuum is maintained inside a gas-tight housing also called enclosure in this application. A typical housing might comprise an insulating element, often a ceramic cylinder, tightly joined with metallic collars, typically made of copper, which guarantees a hermetic seal so that the high vacuum can be maintained inside the enclosure for the operating lifetime of the capacitor. The most common joining technique is a brazing process which may require brazing temperatures up to 800° C. depending on the braze filler material. This brazing step prevented until now the use of electrode unit with a supporting part made of a highly heat conductive material, such as copper, and spiral wound band-shaped capacitor plate made of a high melting point material, such as stainless-steal, molybdenum, tantalum or tungsten. If one just replaces the spiral wound band-shaped capacitor plate of the copper made known electrode unit with a capacitor plate made of a high melting material, the capacitor collapses during the assembly of the vacuum capacitor, precisely during the brazing process. Due to the collapse such electrode units, respectively vacuum capacitor, cannot be reliably used.

Nevertheless, as mentioned above, electrode units for vacuum capacitor featuring a band-shaped capacitor made of a high melting point material and vacuum capacitors comprising one or more such electrode units would have numerous advantages. It is therefore a goal of the present invention to propose a novel electrode unit thanks to which the risk of collapsing during the brazing step of the assembly process of the vacuum capacitor is avoided. It is also a goal of the present invention to propose a vacuum capacitor which can withstand higher working voltage thanks to electrode units having a band-shaped capacitor plate made of a high melting point material.

Thus, the component of an aspect of the present invention is to propose a novel electrode unit for a vacuum capacitor and a novel vacuum capacitor, with which the above-described drawbacks of the known systems are completely overcome or at least greatly diminished.

An element of an aspect of the present invention is in particular to propose an electrode unit for a vacuum capacitor comprising a supporting part made of a highly heat conductive material and a spiral wound band-shaped capacitor plate made of a high melting point metal that permits to avoid collapsing of the electrode unit during the brazing step of the assembly process of the vacuum capacitor.

According to an aspect of the present invention an electrode unit for an electric vacuum capacitor is provided comprising a band-shaped capacitor plate with a height H, wherein the band-shaped capacitor plate is wound in a spiral with a maximum diameter Dmax and a constant distance between successive turns, wherein the band-shaped capacitor plate comprises a first longitudinal edge attached to a supporting part and a second longitudinal edge, the second longitudinal edge being free, wherein at the outer extremity of the spiral, the first longitudinal edge and the second longitudinal edge are connected by an inclined edge such that the first longitudinal edge is longer than the second longitudinal edge, and wherein the inclined edge forms with the longitudinal axis of the band-shaped capacitor plate an angle $\alpha$ less than or equal to an angle $\alpha max=(45°\cdot\pi/180°)$.

The inventors have found out that with angle $\alpha$ between the inclined edge of the capacitor plate and its longitudinal axis less than or equal to $\alpha max=(45°\cdot\pi/180°)$, it is possible to provide for electrode units that have a supporting plate made of a highly heat conductive material, such as copper, silver, aluminum, an alloy thereof or the like and a band-shaped capacitor plate made of a high melting point metal such as stainless steel, carbon steel, molybdenum, tantalum, tungsten, nickel, Inconel®, titanium, chromium or an alloy thereof and that does not collapse during the brazing process employed in the manufacturing process of vacuum capacitors. This is highly advantageous, since highly heat conductive supporting plate allows for an optimal heat transport while a capacitor plate made of one of the enumerated materials allows for reaching higher voltage before vacuum breakdown happens. Simulations have shown that with the proper value of $\alpha$ Von Mises stresses due to temperature variations, that are the cause of failure of the electrode units known in the art, can be avoided or at least greatly diminished.

In a first preferred embodiment of the present invention, angle $\alpha$ is greater than or equal to an angle $\alpha min=\gamma\cdot\tan-1(2H/(\pi\cdot D))$, wherein $\gamma$ is a real number greater than or equal to 1.0. With this angle, it is ensured that before reaching half a turn, the outermost spiral extends to the full height H of the other windings and ensures a satisfactory mating with a counter electrode unit. The counter electrode unit is therefore also referred to as mating electrode unit.

The factor $\gamma$ greater than 1.0 can furthermore advantageously be chosen to optimize the shape of the outermost winding of the capacitor plate in order to use the available volume for the electrode unit which will subsequently be placed into. Indeed, vacuum capacitors (for which these electrode units are intended) are typically required to have a small volume which is easier to pump down. Another requirement for small volume of vacuum capacitors is that they are often integrated into equipment pieces such as impedance matching boxes which have themselves limited volume. The volume inside the vacuum capacitor enclosure should therefore be used efficiently. By choosing the factor $\gamma$ bigger than 1, it is possible to fill up an otherwise void volume with additional, capacitance-generating, metal.

In a second preferred embodiment, the supporting part is made of copper, silver, aluminum or an alloy thereof and the band-shaped capacitor plate is made of stainless steel, carbon steel, molybdenum, tantalum, tungsten, nickel, Inconel®, titanium, chromium or an alloy thereof. With this an electrode unit with a high heat flow, thanks to the copper supporting part, and with high vacuum breakdown voltage, thanks to the material of the band-shaped capacitor plate, can be provided without the risk of collapsing during the assembly of the vacuum capacitor.

In another preferred embodiment of the present invention, $\alpha max$ is equal to $(35°\cdot\pi/180°)$. This ensures that the deformation of the band-shaped capacitor plate of the electrode unit during the brazing step of the manufacturing process of a vacuum capacitor is small.

In another preferred embodiment of the present invention, $\alpha max$ is equal to $(23°\cdot\pi/180°)$. The deformation of the band-shaped capacitor plate of the electrode unit during the brazing step of the manufacturing process of a vacuum capacitor is even smaller. Higher precision vacuum capacitors can thus be manufactured. An angle $\alpha$ chosen less than or equal to $(23°\cdot\pi/180°)$ is particularly favorable since then the thermal stresses produced during the manufacturing of the electrode units can be maintained small even for high brazing temperatures allowing for a more flexible brazing process.

This can especially be advantageous when the electrode unit is integrated in a vacuum capacitor which manufacturing process that requires multi-step brazing, including for example a very high-temperature first brazing step at approximately 930° C. (using for example a palladium alloy braze filler), a second brazing step at approximately 800° C. (using a copper-silver alloy braze filler) and an additional brazing step at approximately 705° C. (using an appropriate indium-copper-silver alloy braze filler). The brazing furnace temperatures mentioned above are indicative and valid for specific filler material compositions. What is important is that the furnace temperature must reach a value above the liquidus temperature of the filler material for each brazing step and subsequent brazing steps must be done at lower temperature so as not to melt the braze filler material used in the previous step(s). Most braze filler materials have a melting temperature range in which solid and liquid phases can coexist. For example, the 705° C. braze temperature mentioned before is appropriate for an indium-copper-silver braze filler alloy with composition In14.5%-Ag24%-Cu61.5% with solidus temperature at 630° C. and liquidus temperature at 705° C. Therefore heating a brazing furnace to 705° C. will fully liquefy that braze filler material and allow it to flow on the surfaces to be brazed together, which upon cooling down will solidify and ensure a good metallic joint. Note that in practice a temperature slightly higher that 705° C. may be chosen to account for possible inhomogeneity in industrial furnaces and to account for possible tolerances of temperature controlling equipment.

In order to avoid melting of the braze filler material used in a preceding step at (800° C. if still referring to the example above), it is important that both the solidus and liquidus temperatures of that previous step's braze filler material are above 705° C. In other words, the melting ranges of the braze filler materials employed in the two brazing steps must not mutually overlap. Multiple-step brazing processes can be advantageous for the manufacture process of vacuum capacitors because an electrode unit (capacitor plate and supporting part) can be brazed independently in a first step and then undergo important surface optimizing processes (such as cleaning, polishing, quality assessment and the like) before the electrode units are then further brazed to the metallic collars of the enclosure of the future vacuum capacitor during one or more subsequent steps, and ultimately the volume inside said enclosure is pumped down to generate the vacuum dielectric medium of the vacuum capacitor. In order to have qualitatively satisfactory and lasting brazing joints for the vacuum capacitor, the melting ranges (that is: the solidus temperature to liquidus temperature spread) of the multiple employed braze filler materials are chosen such that they do not overlap. Above paragraphs relate to the electrode units described earlier, because it can now be realized why choosing the capacitor plate angle $\alpha$ to be less than or equal to $(23°\cdot\pi/180°)$ is beneficial because it enables multiple brazing steps at increasingly higher temperature. This is attributed to the smaller angle value beneficially resulting in less critical van Mises stresses despite the very large temperature cycles involved.

In yet another preferred embodiment of the present invention, the inclined edge is radiused at the transition to the first longitudinal edge and/or the second longitudinal edge. This permits to avoid sharp edges or spikes at the transition between the inclined edges and the longitudinal edges of the capacitor plate that could favor electric field breakdown in vacuum.

In a further preferred embodiment of the present invention, the supporting part comprises a spiral-shaped guiding edge arranged in the space formed by two successive turns of the band-shaped capacitor plate, wherein the width of the guiding edge corresponds to the distance between two successive turns of the band-shaped capacitor plate. Thanks to the guiding edges it is possible to easily attach the capacitor plate to the supporting part while guaranteeing that the distance between two successive turns remains constant.

In yet another preferred embodiment of the present invention, the band-shaped capacitor plate is attached to the supporting part by means of brazing.

According to another aspect of the present invention a vacuum capacitor is provided comprising an enclosure to contain a vacuum dielectric medium, a first electrode unit and a second electrode unit separated by said vacuum dielectric medium, the enclosure comprising a first conductive collar in electrical contact with the first electrode unit and a second conductive collar in electrical contact with the second electrode unit, the first conductive collar and the second conductive collar being separated by an insulating element of the enclosure, wherein at least one of the first electrode unit or the second electrode unit is an electrode unit according to the present invention.

Thanks to the electrode units with a band-shaped capacitor plate made of a high melting point metal, vacuum capacitors with higher working voltage can be attained. The maximum value of the angle of the inclined edge of the band-shaped capacitor plate of the electrode units ensures that the band-shaped capacitor plate does not collapse during the required brazing step of the metallic collars to the insulating enclosure of the capacitor. This collapsing of the band-shaped capacitor has been, until now, the reason why vacuum capacitors comprising electrode units with spiral-wounded band-shaped capacitor plates made of a high melting point material such as stainless steel, carbon steel, molybdenum, tantalum, tungsten, nickel, Inconel®, titanium, chromium or an alloy thereof have not been available. A further advantage of the vacuum capacitor according to the present invention is given by the combination of a capacitor plate made of a high melting point material with a supporting plate made of highly heat conductive metal that allows for high working current required in many applications of the vacuum capacitor.

In a first preferred embodiment of this aspect of the present invention, the vacuum capacitor comprises two mating electrode units according to the present invention, wherein the spirals of the band-shaped capacitor plates are chiral. This makes it possible to obtain a vacuum capacitor with spirally intertwined capacitor plates, wherein the first capacitor plate of one electrode unit is in the space between two successive turns of the capacitor plate of the other electrode unit.

In another preferred embodiment of this aspect of the invention, the band-shaped capacitor plate and the supporting plate of the at least one electrode unit are attached to each other with a first braze filler material and the first conductive collar and the second conductive collar are each attached to opposite ends of the insulating element of the enclosure with a second braze filler material, wherein the first braze filler material and the second braze filler material are selected to have non-overlapping melting ranges.

This advantageously allows to include important surface optimizing processes (such as cleaning, polishing, quality assessment and the like) in between successive brazing steps. Such optimizing processes may be required to achieve highest possible voltage compatibility of the vacuum capacitor in operation. Indeed field breakdown thresholds in vacuum are mainly dependent on electrode surface quality (and on a good vacuum level in-between these surfaces).

In another preferred embodiment of this aspect of the invention, the first braze filler material has a higher melting temperature as the second braze filler material. This advantageous since it guarantees that the first braze filler material does not melt during the attachment process of the conductive collars to the insulating element.

In yet a further preferred embodiment of this aspect of the invention, the band-shaped capacitor plate and the supporting plate of one electrode unit are attached to each other with a first braze filler material, wherein the band-shaped capacitor plate and the supporting plate of the other electrode unit are attached to each other with a second braze filler material, wherein the first conductive collar and the second conductive collar are each attached to opposite ends of the insulating element of the enclosure with a third braze filler material, wherein the first braze filler material, the second braze filler material and the third braze filler material are selected to have mutually non-overlapping melting ranges.

This advantageously allows flexibility in successive manufacturing steps, quality assurance in-between those steps and reliable vacuum tight metal-metal joints and metal-insulator joints (with the insulator part of the enclosure).

In another preferred embodiment of this aspect of the present invention, a bellows and a moving system are provided for allowing to change the position of at least one of the two electrode units. This allows for having an adjustable capacitance value of the vacuum capacitor by adjusting the surface overlap of the band-shaped capacitor plates of the electrode units. The moving system can, for example, comprise a simple screw and nut system or another mechanism which allows similar adjustments.

In another preferred embodiment of this aspect of the present invention, the surface overlap of the band-shaped capacitor plates of the two electrode units of the vacuum capacitor is fixed. This allows for having a fixed capacitance value of the vacuum capacitor.

DETAILED DESCRIPTION

Figure 1:
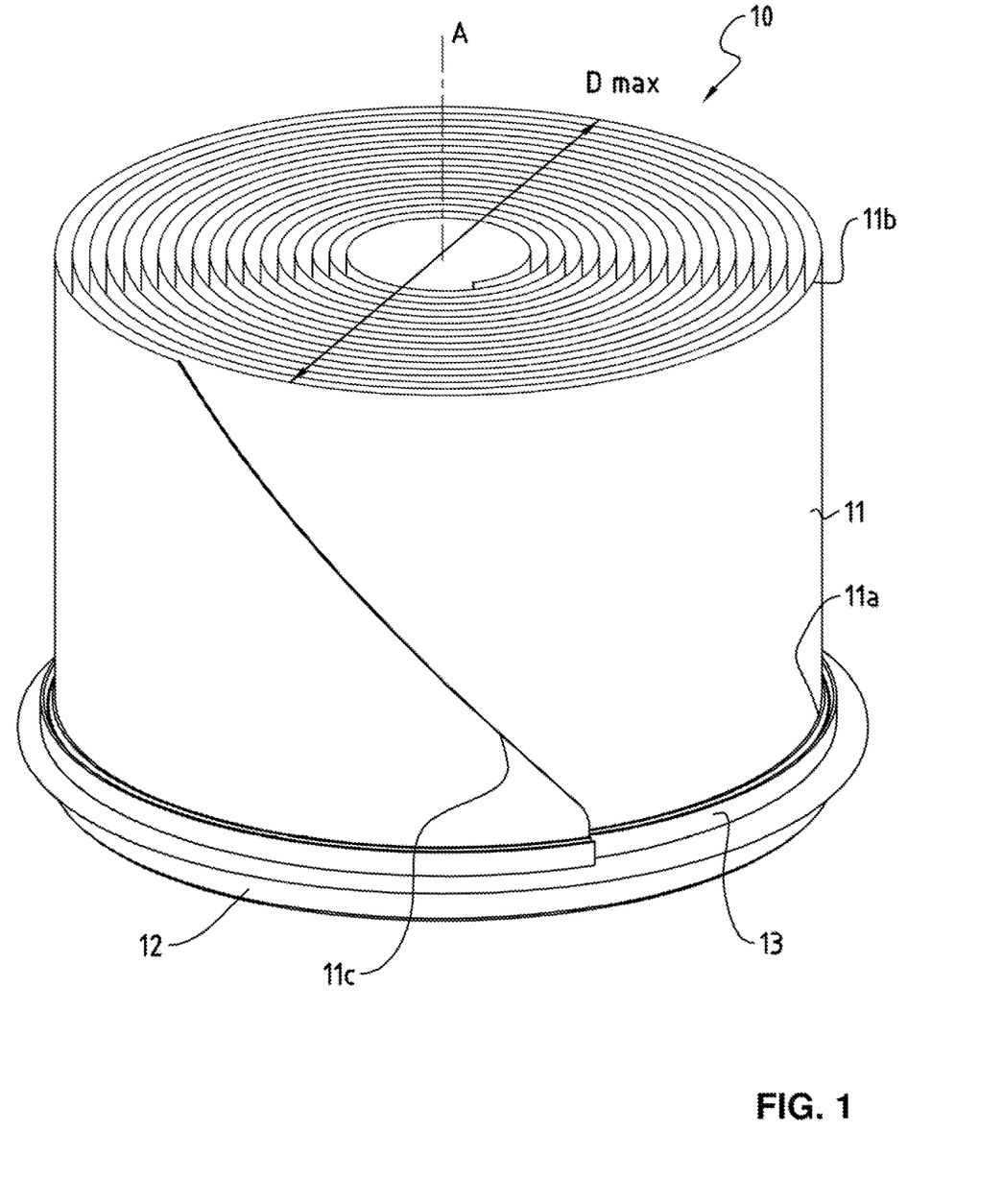
FIG. 1 is a perspective side view of an electrode unit according to a first embodiment of the present invention.
Figure 3A:
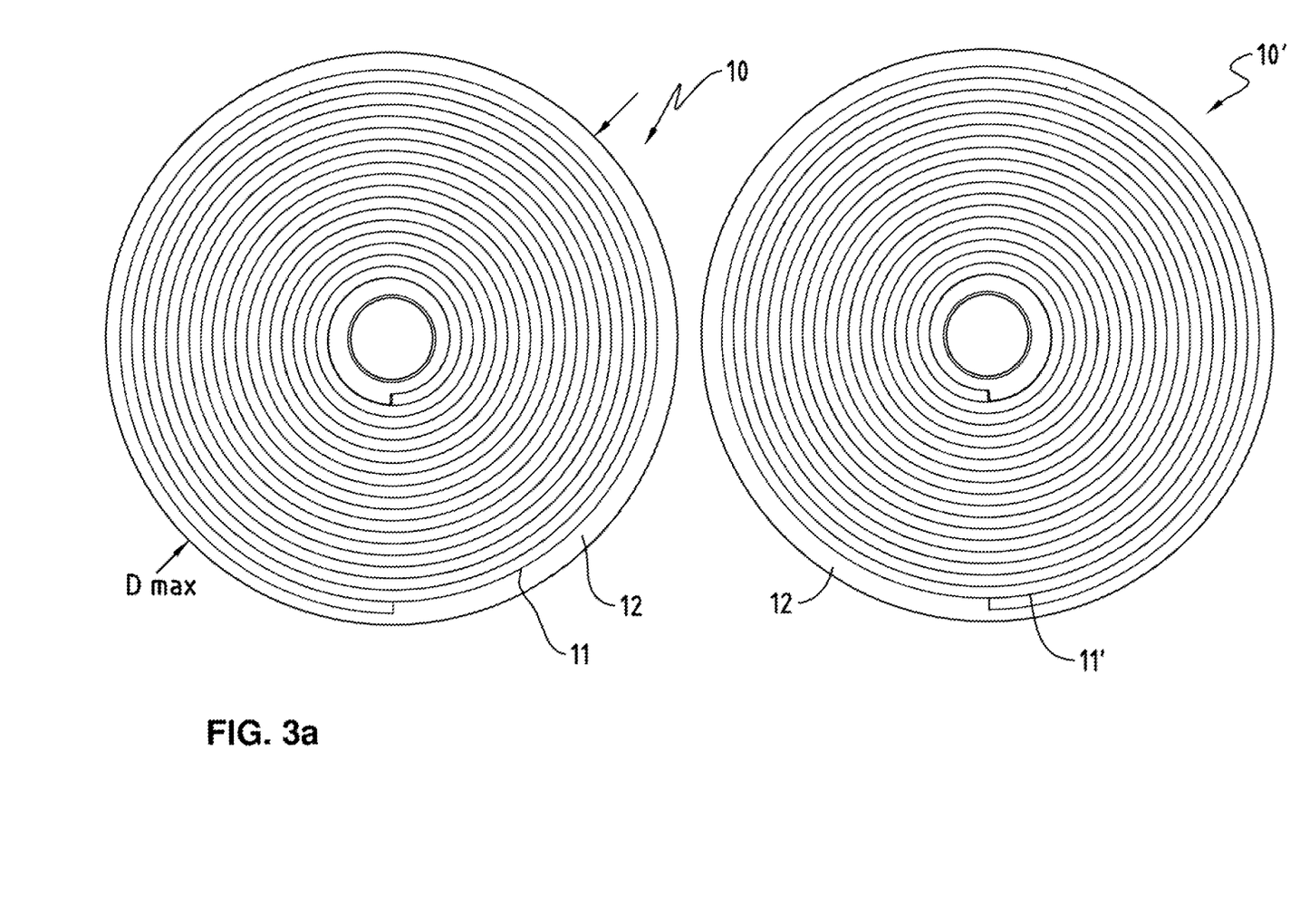
FIG. 3a is a top view of two mating electrode units according to the first embodiment of the present invention.
Figure 3B:
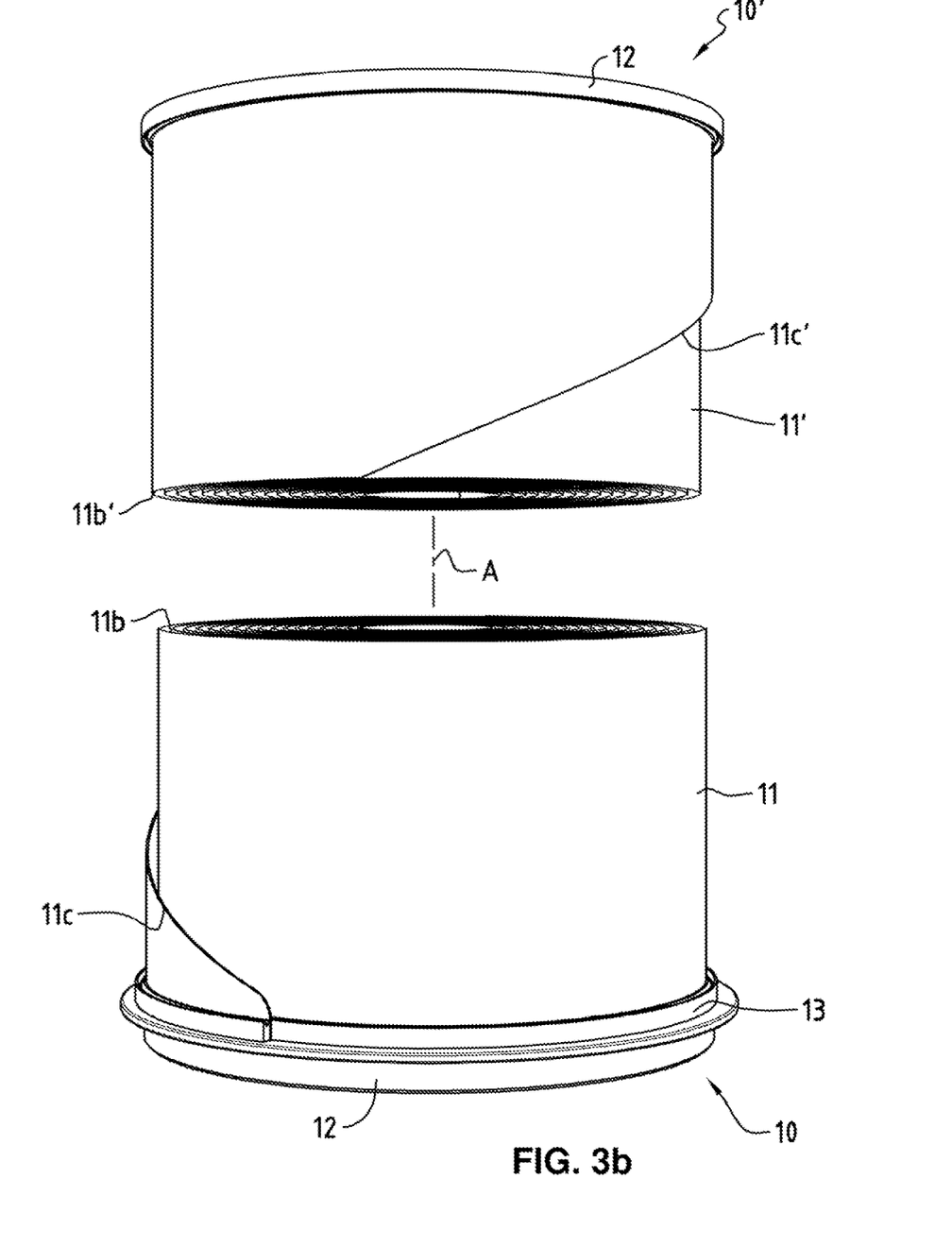
FIG. 3b illustrates the orientation of two mating electrode units according to the present invention.
Figure 3C:
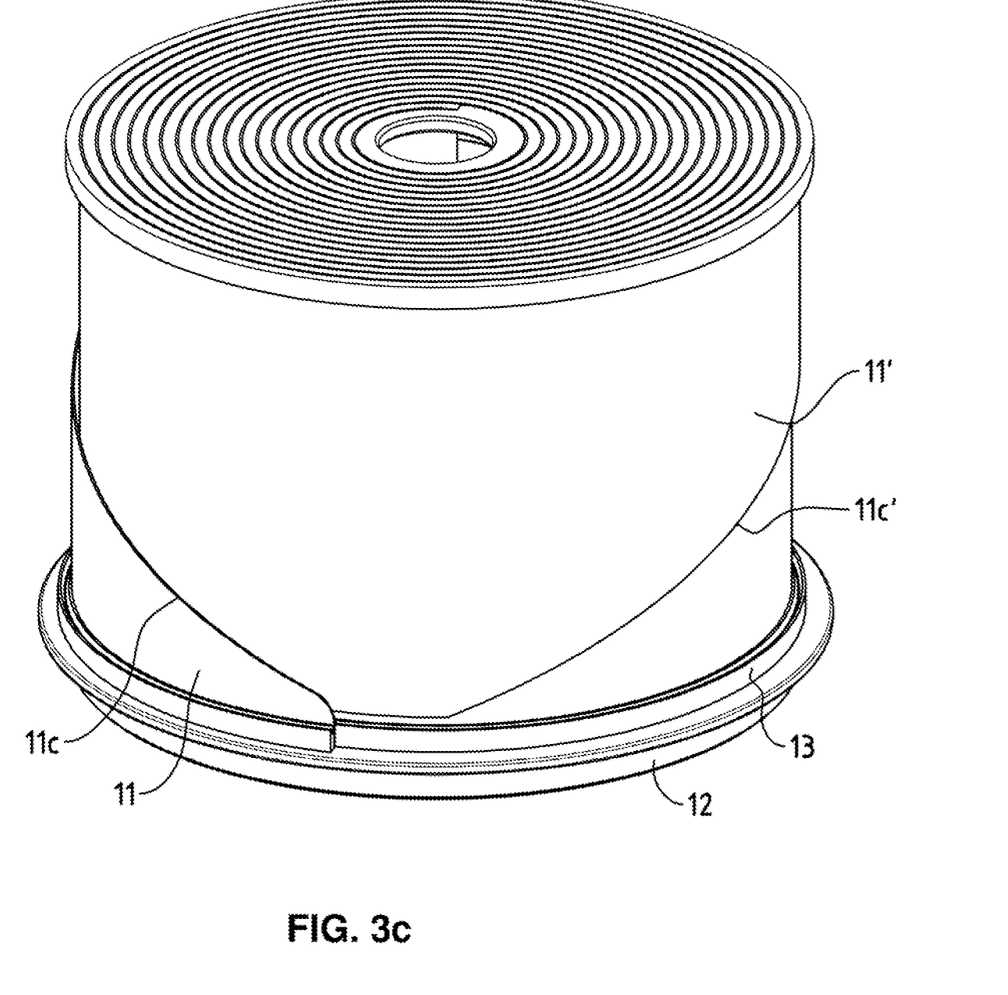
FIG. 3c illustrates the insertion of two mating electrode units according to the present invention.

FIG. 1 shows a perspective view of an electrode unit 10 according to a first preferred embodiment of the present invention. The electrode unit 10 comprises a band-shaped capacitor plate 11 that is wound in a spiral around the rotation axis A of a supporting part 12. The spiral has a maximum diameter Dmax and successive turns are equidistant to each other as shown also in FIG. 3a. The distance between two successive turns exceeds advantageously the thickness of the band-shaped capacitor plate 11. This allows for using two mating electrode units 10 wherein the band-shaped capacitor of a first electrode unit is located in the space between successive turns of a second electrode unit. Two mating electrodes units 10 and 10' are illustrated in FIG. 3a. The electrode units 10 and 10' differ in that the spirals of the band-shaped capacitor plates 11 and 11 are chiral. This allows, as illustrated in FIGS. 3b and 3c, to insert the band-shaped capacitor plate of one of the electrode unit into the space between successive turns of the band-shaped capacitor plate of the other electrode unit and by that changing the surface overlap of the capacitor plates.

The band-shaped capacitor plate 11 comprises a first longitudinal edge 11a attached to the supporting plate 12 and a second longitudinal edged 11b that is free. At the outer extremity of the spiral, the band-shaped capacitor plate 11 exhibits an inclined edge 11c that connects the first longitudinal edge 11a with the second longitudinal edge 11b.

The supporting part 12 comprises advantageously a spiral-shaped guiding edge 13 arranged in the space formed by two successive turns of the band-shaped capacitor plate 11. The width of the guiding edge 13 corresponds to the distance between two successive turns of the band-shaped capacitor plate 11. The guiding edge 13 have the advantage of guaranteeing that the successive turns of the capacitor plate 11 remains equidistant during the assembly of the band-shaped capacitor plate 11 with the supporting part 12.

As mentioned earlier, the vacuum enclosure of vacuum capacitors must comprise an insulating piece, most often a cylindrical ceramic which is brazed to the two metallic collars. When trying to replace the copper band-shaped capacitor plate of electrode unit known in the art with a band-shaped capacitor plate made of a high melting point material, such as for instance stainless-steal, it has been observed by the inventors that the band-shaped capacitor electrodes collapse, i.e. the distance between successive turns changes, during the brazing process.

Figure 2:
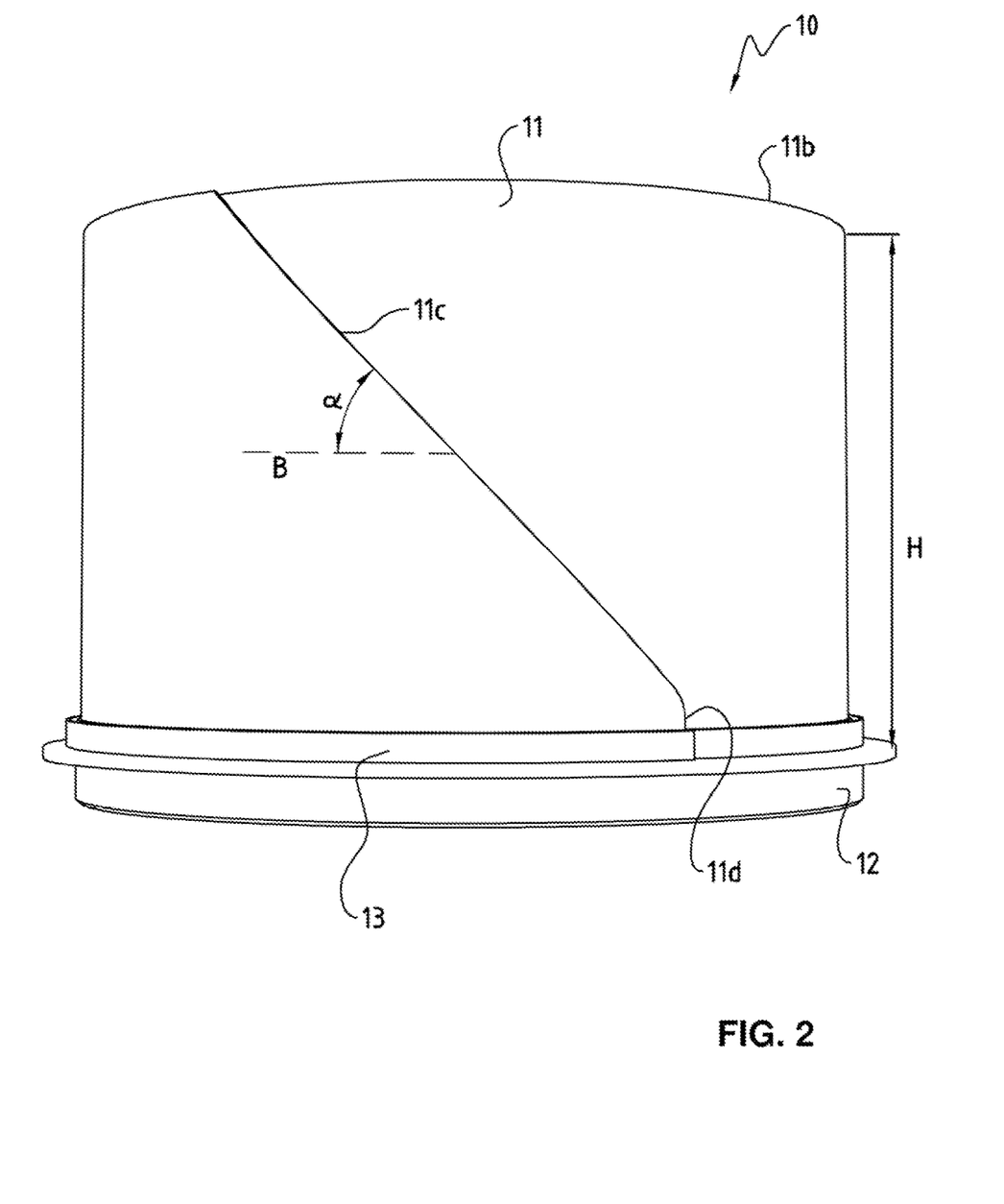
FIG. 2 is a side view of an electrode unit according to the first embodiment of the present invention.

The inventors have figured out that the value of angle $\alpha$, the angle that is formed by the longitudinal axis B of the capacitor plate 11 with the inclined edge 11c, is critical to permit to have an electrode unit 10 with supporting part 12 made of copper, silver, aluminum, an alloy thereof or the like and the band-shaped capacitor plate 11 made of a high melting point material, such as stainless steel, carbon steel, molybdenum, tantalum, tungsten, nickel, Inconel®, titanium, chromium or an alloy thereof, that is not collapsing during the thermal cycling of the brazing process used in the manufacturing of vacuum capacitor. Simulations have shown that with proper values of a Von Mises stresses due to temperature variations, that are the cause of failure of the electrode unit known in the art, can be avoided or at least greatly diminished. The inventors have determined that angle $\alpha$ shall be less than or equal to an angle $\alpha max=(45°\cdot\pi/180°)$. An austenitic stainless steel which is non-magnetic, such as alloy 1.4301 can preferably be used to avoid or to minimize parasitic effects due to the strong electro-magnetic field present in typical application environments of the vacuum capacitor. These parasitic effects could lead to overheating or to otherwise poor capacitor performance in power applications.

As explained above, it is critical that angle $\alpha$ is smaller than an upper value $\alpha max$. It is also advantageous that angle $\alpha$ is greater than or equal to an angle $\alpha min=\gamma\cdot\tan-1(2H/(\pi\cdot D))$, wherein H is the height of the band-shaped capacitor plate 11. The reason for the advantageous lower limit $\alpha min$ is to ensure that before reaching half a turn, the outermost spiral extends to the full height H of the other windings and ensures a satisfactory mating with a counter electrode unit.

The electrode unit 10 of FIG. 2 exhibits, for instance, an angle of $(45°\cdot\pi/180°)$ which is the upper allowable limit for stainless steel. It is, nevertheless, possible that the upper limit $\alpha max$ is slightly different, lower or higher, for other materials. A skilled person, now knowing that the value of angle $\alpha$ is critical, will have no difficulty to find the exact upper limit $\alpha max$ for the material of choice for the band-shaped capacitor plate.

Advantageously, the inclined edged 11c has radiused portion 11d at the transition to the first longitudinal edge 11a. While in FIGS. 1 and 2 such a radiused portion is provided only at the first longitudinal edge 11a, it could also be provided at the transition to the second longitudinal edge 11b. The one or more radiused portion have the advantage to avoid forming sharp edges or spikes that could favor vacuum breakdown.

Figure 4:
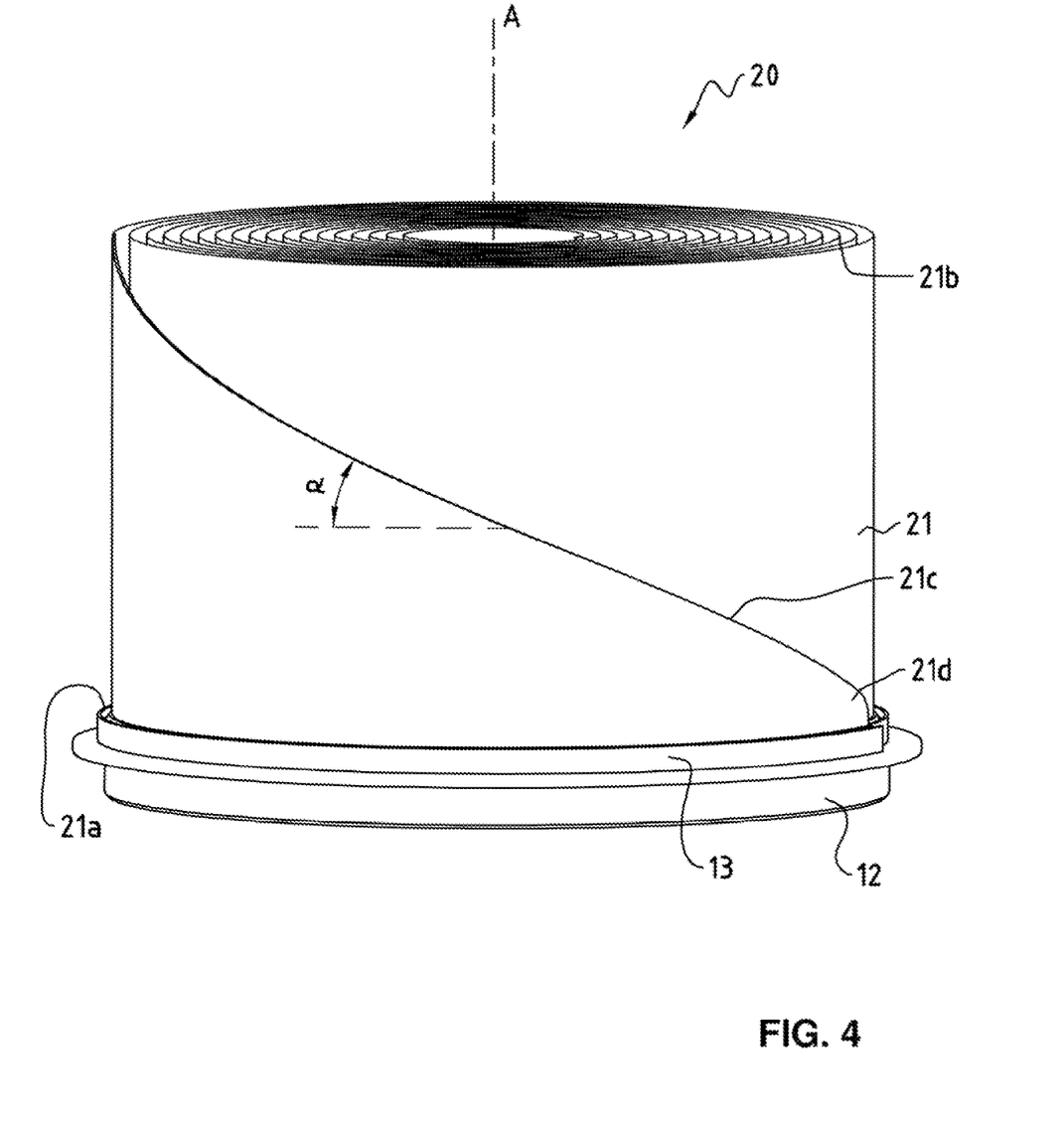
FIG. 4 is a first side view of an electrode unit according to a second embodiment of the present invention.
Figure 5:
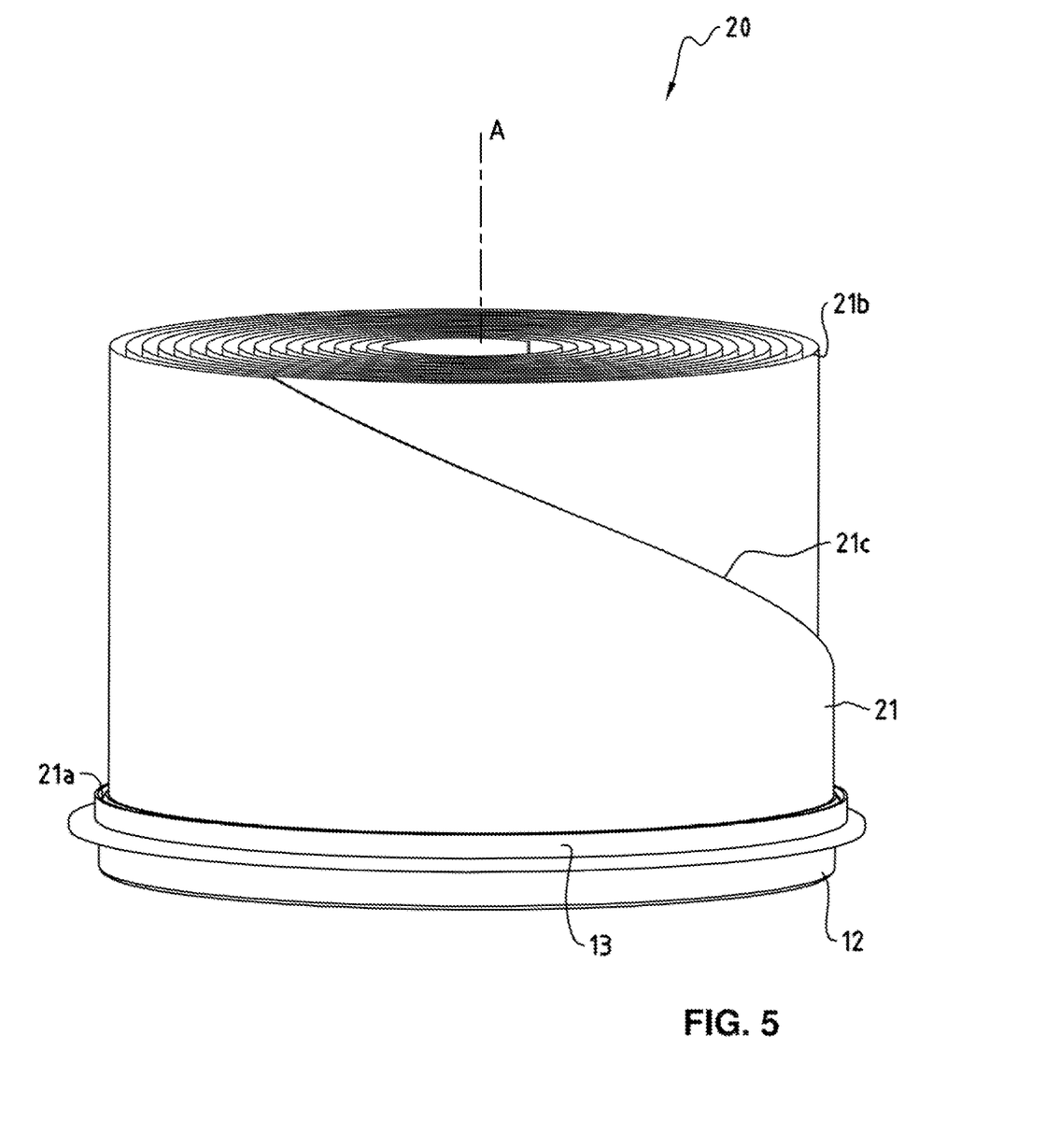
FIG. 5 is a second side view of an electrode unit according to the second embodiment of the present invention.

FIGS. 4 and 5 show side views of an electrode unit 20 according to a second preferred embodiment of the present invention. The electrode unit 20 differs from electrode unit 10 solely by the shape of the band-shaped capacitor plate 21. As illustrated in FIG. 4, the inclined edge 21c of the capacitor plate 21 form with its longitudinal axis an angle α smaller than in electrode unit 10. To be precise angle α of electrode unit 20 amounts for (22.5·π/180°).

Figure 6:
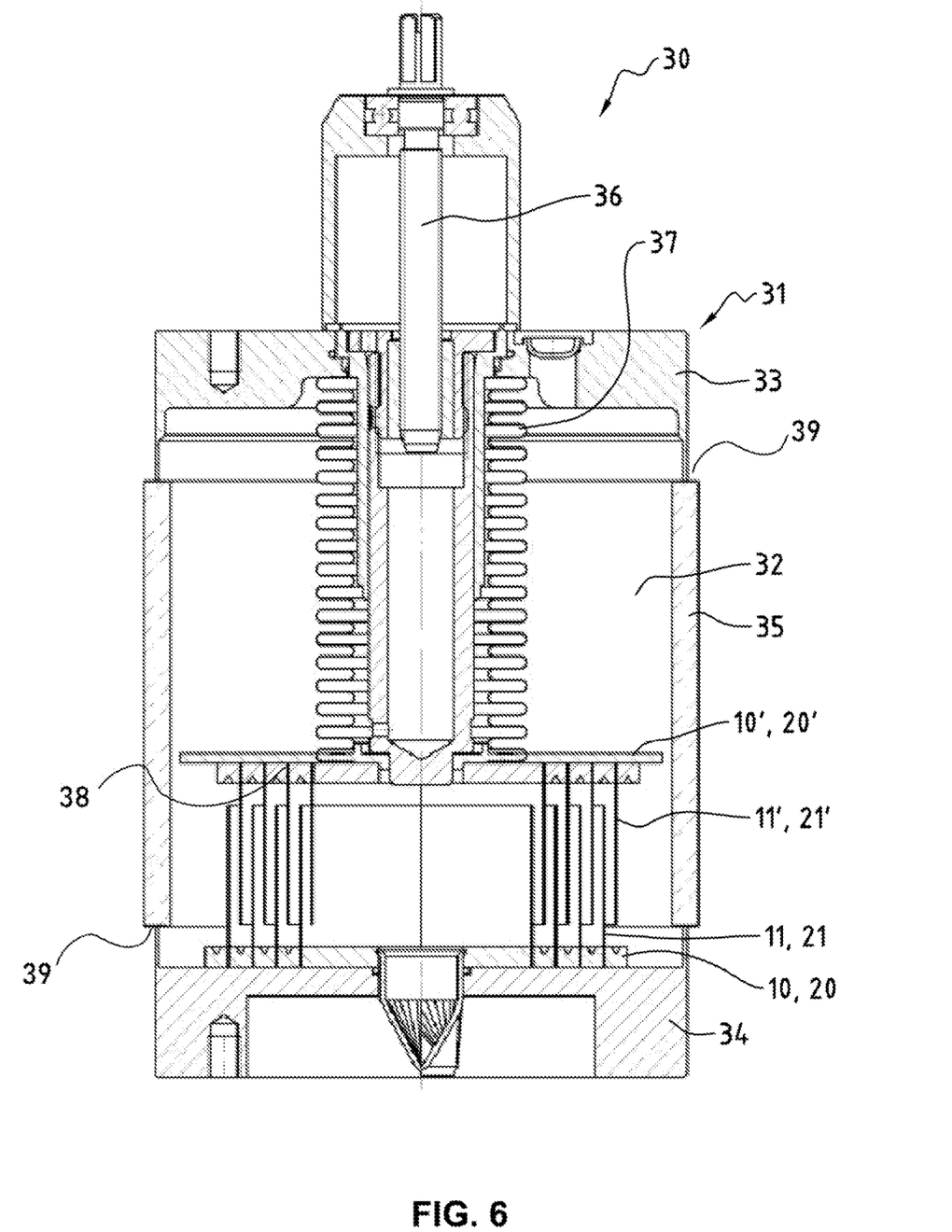
FIG. 6 is a section view of a vacuum capacitor according to a preferred embodiment of the present invention.

FIG. 6 shows a section view of a vacuum capacitor 30 according to a preferred embodiment of this aspect of the present invention. The vacuum capacitor 30 comprises an enclosure 31 to contain a vacuum dielectric medium 32; the enclosure comprising a first conductive collar 33 and a second conductive collar 34 separated by an insulating element 35 of the enclosure 31. Commonly the insulating element 35 is made of a ceramic material in the shape of a cylinder. For the manufacturing process the insulating element 35 is brazed to the metallic collars 33, 34 with a second braze filler material 39. During this process a temperature of approximately 800° C. is required. Such a temperature, if not using an electrode unit according to the present invention, leads to the collapse of the band-shaped capacitor plates 11,21 of the electrode units 10,20. As shown in FIG. 6, the electrode units 10,20 positioned inside the vacuum dielectric 32 are in electric contact with conductive collars 33 and 34 respectively, and the vacuum capacitor can be a variable vacuum capacitor with adjustable electrode unit surface overlap by using a moving mechanism 36 and expandable bellows 37. Because the band-shaped capacitor plate 11, 21 and the supporting plate 12 of the electrode units 10, 20 are brazed together by means of a first braze filler material 38 and the ceramic cylinder 35 needs also to be brazed with the metallic collars 33, 34 with the second braze filler material 39 in a vacuum tight manner, the braze filler materials 38 and 39 employed for the successive brazing steps are preferably chosen to have non-overlapping melding ranges. It can also be advantageous to provide for two different braze filler materials for the brazing step of the two electrode units 10, 20.

Finally, the foregoing has outlined pertinent non-limiting embodiments. It will be clear to those skilled in the art that modifications to the disclosed non-limiting embodiments can be carried out without departing from the spirit and scope thereof. As such, the described non-limiting embodiments ought to be considered merely illustrative of some of the more prominent features and applications. Other beneficial results can be realized by applying the non-limiting embodiments in a different manner or modifying it in ways known to those familiar with the art. It is especially important to notice that is not possible to describe here all possible embodiments, in particular all possible angle α that permits to attain the goal of the present invention. Nevertheless, a person skilled in the art will know how to adapt angle α to the material of choice for the capacitor plate.

The invention claimed is:

1. Electrode unit for an electric vacuum capacitor comprising a band-shaped capacitor plate with a height H, wherein the band-shaped capacitor plate is wound in a spiral with a maximum diameter Dmax and a constant distance between successive turns, wherein the band-shaped capacitor plate comprises a first longitudinal edge attached to a supporting part and a second longitudinal edge, the second longitudinal edge being free, wherein, at the outer extremity of the spiral, the first longitudinal edge and the second longitudinal edge are connected by an inclined edge such that the first longitudinal edge is longer than the second longitudinal edge, wherein the inclined edge forms with the longitudinal axis (B) of the band-shaped capacitor plate an angle α less than or equal to an angle αmax=(45°·π/180°), wherein angle α is greater than or equal to an angle αmin=γ·tan−1(2H/(π·Dmax)), wherein γ is a real number greater than or equal to 1.0, and wherein the supporting part is made of copper, silver, aluminum or an alloy thereof and the band-shaped capacitor plate is made of stainless steel, carbon steel, molybdenum, tantalum, tungsten, nickel, Inconel®, titanium, chromium or an alloy thereof.

2. Electrode unit according to claim 1, wherein αmax is equal to (35°·π/180°).

3. Electrode unit according to claim 1, wherein αmax is equal to (23°·π/180°).

4. Electrode unit according to claim 1, wherein the inclined edge is radiused at the transition to the first longitudinal edge and/or the second longitudinal edge.

5. Electrode unit according to claim 1, wherein the supporting part comprises a spiral-shaped guiding edge arranged in the space formed by two successive turns of the band-shaped capacitor plate and wherein the width of the guiding edge corresponds to the distance between two successive turns of the band-shaped capacitor plate.

6. Electrode unit according to claim 1, wherein the band-shaped capacitor plate is attached to the supporting part by means of brazing.

7. Vacuum capacitor comprising an enclosure to contain a vacuum dielectric medium, a first electrode unit and a second electrode unit separated by the vacuum dielectric medium, the enclosure comprising a first conductive collar in electrical contact with the first electrode unit and a second conductive collar in electrical contact with the second electrode unit, the first conductive collar and the second conductive collar being separated by an insulating element of the enclosure, wherein at least one of the first electrode unit or the second electrode unit is an electrode unit according to claim 1.

8. Vacuum capacitor according to claim 7, vacuum capacitor comprising two mating and coaxially oriented electrode units according to claim 1, wherein the spirals of the band-shaped capacitor plates are chiral.

9. Vacuum capacitor according to claim 7, wherein the band-shaped capacitor plate and the supporting plate of the at least one electrode unit are attached to each other with a first braze filler material and the first conductive collar and the second conductive collar are each attached to opposite ends of the insulating element of the enclosure with a second braze filler material, wherein the first braze filler material and the second braze filler material are selected to have non-overlapping melting ranges.

10. Vacuum capacitor according to claim 9, wherein the first braze filler material has a higher melting temperature as the second braze filler material.

11. Vacuum capacitor according to claim 7, wherein the band-shaped capacitor plate and the supporting plate of one electrode unit are attached to each other with a first braze filler material, wherein the band-shaped capacitor plate and the supporting plate of the other electrode unit are attached to each other with a third braze filler material, wherein the first conductive collar and the second conductive collar are each attached to opposite ends of the insulating element of the enclosure with a second braze filler material, wherein the first braze filler material, the second braze filler material and the third braze filler material are selected to have mutually non-overlapping melting ranges.

12. Vacuum capacitor according to claim 7, further comprising a bellows and a moving system for allowing to change the position of at least one of the two electrode units.

13. Vacuum capacitor according to claim 7, wherein the surface overlap of the band-shaped capacitor plates of the two electrode units is fixed.

\* \* \* \* \*